Aug. 1, 1961  C. R. FREAS  2,994,730
SEALED COUNTER CELL
Filed Nov. 14, 1955
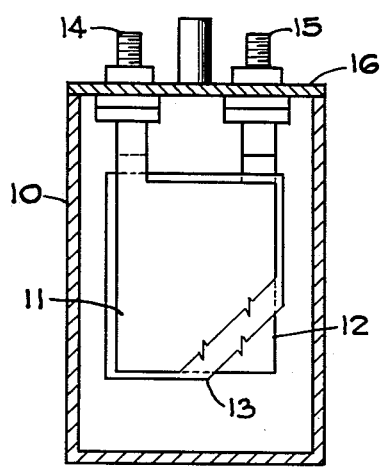
FIGURE-1
INVENTOR.
CLARK R. FREAS
BY
ATTORNEY

United States Patent Office 2,994,730
Patented Aug. 1, 1961

2,994,730
SEALED COUNTER CELL
Clark R. Freas, Levittown, Pa., assignor to The Electric Storage Battery Company, a corporation of New Jersey
Filed Nov. 14, 1955, Ser. No. 546,610
2 Claims. (Cl. 136—100)

The invention relates to counter electromotive force cells, commonly known as counter E.M.F. cells or counter cells, and more particularly to such cells having containers that are sealed to prevent the passage of gases.

A counter cell conventionally consists of two or more electrodes immersed in a suitable electrolyte and is inserted into an electrical circuit to produce an electromotive force or voltage which is counter to the flow of current in the circuit, a prime requisite being the lack of any capacity build up in the cell. The function of this type of cell is similar to that of a resistance or rheostat in that, by the use thereof, the voltage of the main circuit will be reduced to a lower desired value. Counter cells differ, however, since they maintain a nearly constant voltage opposed to the flow of current, whereas the voltage absorbed by a resistance varies directly with the current it is carrying. Counter cells are widely used in the telephone field where there are storage batteries that are connected permanently to a load circuit.

In the past, counter cells of various types have been used. One such cell has consisted of lead or lead antimony alloy grids immersed in a solution of sulfuric acid but this type has been found objectionable in that a certain amount of capacity has been developed which caused an excessive flow of current when the cell was short circuited. Additionally, the grids tended to disintegrate and deposit sediment in the bottom of the cell. Counter cells currently in use are generally of the type having an alkaline electrolyte with sheet metal electrodes of nickel, stainless steel, and other like metals which are unattackable in the alkaline medium when an electric current is passed therethrough. These cells are, however, subject to a serious defect in that the passage of current decomposes the water of the electrolyte into hydrogen and oxygen, which gases escape from the cell and necessitate servicing at intervals to restore the electrolyte to its optimum condition. Furthermore, the alkaline electrolyte, generally a solution of potassium hydroxide, tends to absorb carbon dioxide from the atmosphere which reacts to form harmful carbonates in the cell.

It is an object of the invention, therefore, to provide a sealed alkaline type counter cell which will not permit the passage of gases out of the cell thereby depleting the electrolyte nor the contact of air with the electrolyte and thus avoid the disadvantages of conventional alkaline counter cells which have been referred to above.

A further object of the invention is to provide a sealed alkaline type counter cell of such construction that a destructive increase of gas pressure will not occur therewithin.

Other objects of the invention will be apparent from the description and claims that follow:

In the drawing, FIGURE 1 represents a schematic elevation in cross section of a counter cell produced in accordance with the invention.

Referring now to the drawing, numeral 10 indicates the container which can be desirably made of an alkali resistant metal, glass or a thermoplastic resin such as polystyrene or other resin of the vinyl group. Container 10 has inserted therein first electrode 11 which can be a conventional type counter cell electrode comprising a sheet of nickel, stainless steel, or other suitable metal which is not subject to anodic corrosion in an alkaline battery and, therefore, incapable of receiving a charge when used as the anode in a counter cell. Without departing from the scope of my invention, however, electrode 11 can also comprise a porous sheet made from sintered metallic powder such as nickel.

A second electrode 12 is provided within container 10 and is spaced from electrode 11. Electrode 12 consists preferably of a porous sheet produced from a sintered metallic powder such as nickel but can also be fabricated from porous graphite or the like, the main criteria for electrode 12 being (1) porosity and (2) resistance to electrolytic attack in the alkaline electrolyte. The pores of electrode 12 are impregnated by any desired method with a metallic hydroxide, such as cadmium hydroxide, in an amount to fill about 35% of the total volume of the pores. It will be understood, of course, that this figure can be varied within rather wide limits but that, for present purposes, we may take such figure as an example of how the invention can be practiced.

Although only two electrodes have been shown and described, the invention is of course applicable as well to those cells containing more than two plates. If this construction is used, the outside plates will generally contain metallic hydroxide in accordance with the description of electrode 12.

A separator 13 is interposed between electrodes 11 and 12 and is in intimate relationship with the surfaces of the respective electrodes. Separator 13 is preferably formed of a microporous thermoplastic resin, such as polyvinyl chloride, polyethylene, or the like, but can also be made of nylon cloth or other materials which are porous, electrically insulating and yet not subject to attack by the alkaline electrolyte. Separator 13 is desirably extremely absorbent so that it will contain the total amount of electrolyte present in the cell in the pores thereof except for that quantity of electrolyte that is contained within the pores of the plates themselves.

Terminals 14 and 15 extend from electrodes 11 and 12 respectively and are adapted for electrical connection with the main circuit in connection with which the cell is adapted to be used.

Cover 16 is sealed to container 10 and is also in sealed relationship with leads 14 and 15 which pass therethrough.

As has been indicated above in connection with conventional type alkaline counter cells, the water of the electrolyte is decomposed by the passage of current through the cell resulting in the evolution of both hydrogen and oxygen gases. In the counter cell of the invention oxygen will be evolved at the first electrode 11 which can be construed in this cell to represent the anode. At the cathode, here represented by second electrode 12, that portion of the current which, as a general rule, would evolve hydrogen, will preferentially tend to convert the cadmium hydroxide within the pores of electrode 12 to metallic cadmium. Since, however, the influence of the current upon electrode 12 tending to convert the cadmium hydroxide to metallic cadmium will create a dynamic balance with the influence of the current evolving oxygen at first electrode 11, the evolved oxygen will immediately react with any metallic cadmium produced in electrode 12 to reduce the same to cadmium hydroxide. In this manner there is prevented any build up of gas pressure within the cell which might result in an explosion or, at the very least, a rupture of the container.

If it is felt to be desirable, electrode 12 after the impregnation with cadmium hydroxide can be subjected to a charge current prior to the sealing of the cell. As a result, and by inflow thereto of electrons, the cadmium hydroxide will be converted to metallic cadmium and, after the cell is sealed in this condition there will be cadmium metal immediately available for oxidation by, or the absorption of, oxygen evolved at first electrode 11 when the bus current is passed through the cell. Further according to the invention the cadmium hydroxide may be converted to metallic cadmium to any desired extent with the result that not only will the metallic cadmium be available for immediate absorption of oxygen but there will be a reserve of cadmium hydroxide which will insure that electrode 12 will never go into overcharge at which point hydrogen would be evolved.

Although the invention has been shown and described in connection with a cell containing only two electrodes, it is to be understood that it is equally applicable to cells containing a multiplicity of electrodes.

From the above it will be seen that I have achieved the objects of the invention, namely, to provide a counter cell which will not require servicing to replenish the electrolyte, in which the electrolyte will not be subjected to harmful reactions caused by contact with the atmosphere, and in which no dangerous pressure build-up of gases will occur.

The description and drawings appearing herein are intended to be exemplary only of the present invention. Other forms and variations coming within the scope of the appended claims will be apparent to others skilled in the art as a result of my teachings.

I claim:

1. A sealed counter cell of the alkaline type characterized by its low gas pressure during operation, comprising a sealed container, an alkali hydroxide electrolyte, at least one anode of a material incapable of being charged by flow of current, at least one cathode including a material readily oxidizable by gaseous oxygen and readily reduced by inflow thereto of electrons, and a porous separator interposed between each anode and each cathode and containing substantially the total amount of said electrolyte within the pores thereof, whereby upon flow of current between said anode and said cathode and through the electrolyte oxygen evolved at the anode will combine with the oxidizable material of the cathode, both to reduce the oxygen within the sealed container and to prevent evolution of hydrogen at said cathode.

2. A sealed counter cell of the alkaline type characterized by its low gas pressure during operation, comprising a sealed container, an alkali hydroxide electrolyte, at least one anode of a material incapable of being charged by flow of current and selected from the group consisting of nickel, iron and stainless steel, at least one cathode having present therein a material readily oxidizable by gaseous oxygen and readily reduced by inflow thereto of electrons selected from the group consisting of cadmium, cadmium hydroxide and mixtures thereof, and a porous separator interposed between each anode and each cathode, whereby upon flow of current between said anode and said cathode and through the electrolyte oxygen evolved at the anode will combine with the oxidizable material of the cathode, both to reduce the oxygen within the sealed container and to prevent evolution of hydrogen at said cathode.

References Cited in the file of this patent

UNITED STATES PATENTS

| | | |
|---|---|---|
| 1,884,166 | Otsuka et al. | Oct. 25, 1932 |
| 2,156,222 | Murphy | Apr. 25, 1939 |
| 2,571,927 | Neumann et al. | Oct. 16, 1951 |
| 2,614,138 | Jacquier | Oct. 14, 1952 |
| 2,634,303 | Moulton | Apr. 7, 1953 |
| 2,642,469 | Gary | June 16, 1953 |
| 2,677,006 | Amelm | Apr. 27, 1954 |

OTHER REFERENCES

Std. Handbook for Electrical Engineers, seventh edition, by Knowlton, 1941.

"Storage Batteries," Vinal, third edition, 1940 edition, pages 281–284.